Figure 1:
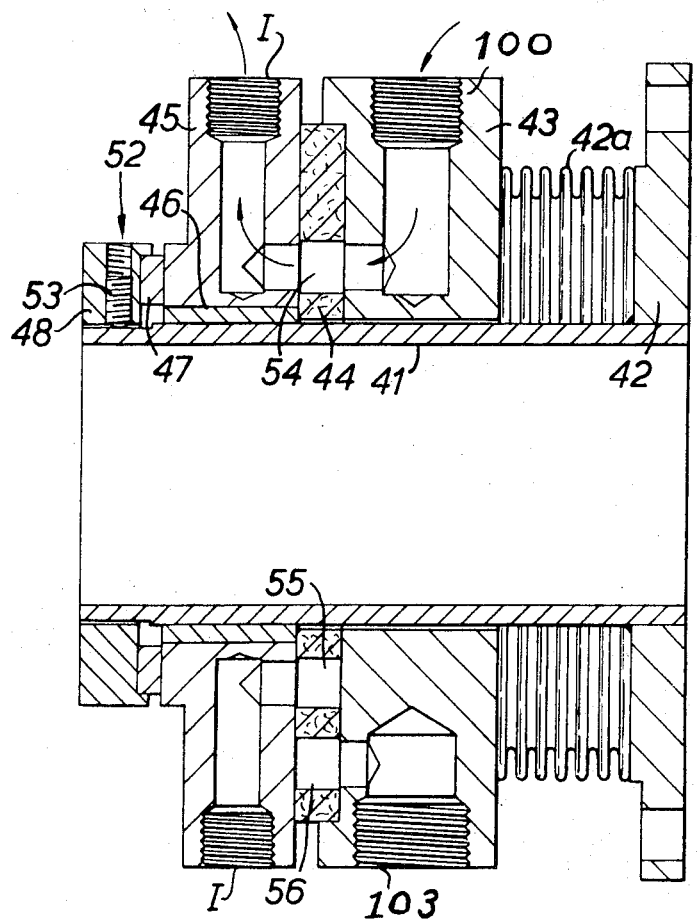

United States Patent
Walker et al.

[15] 3,658,092
[45] Apr. 25, 1972

[54] ROTARY UNIONS

[72] Inventors: Gordon Richard Walker, 36 Benbury Road, Southam; William Murray, 7 Vicarage Road, both of Leamington Spa, England

[22] Filed: Jan. 21, 1970

[21] Appl. No.: 8,110

Related U.S. Application Data

[62] Division of Ser. No. 638,334, May 15, 1967, Pat. No. 3,570,536.

[30] Foreign Application Priority Data

May 18, 1966 Great Britain.......................22,149/66

[52] U.S. Cl.....................................................137/625.21
[51] Int. Cl............................................................F16k 11/02
[58] Field of Search..................137/625.21, 625.22, 625.23, 137/625.24, 580, 625.11

[56] References Cited

UNITED STATES PATENTS

| | | |
|---|---|---|
| 2,600,099 | 6/1952 | Detrez................................137/625.21 |
| 2,675,830 | 4/1954 | Vuillemin...........................137/625.21 |
| 2,831,651 | 4/1958 | Hutchings............................137/580 X |
| 2,878,786 | 3/1959 | Vuillemin.......................137/625.23 X |
| 3,254,674 | 6/1966 | Leask................................137/625.23 |

*Primary Examiner*—Henry T. Klinksiek
*Attorney*—Cushman, Darby & Cushman

[57] ABSTRACT

A distributor for permitting fluid to be sequentially distributed to a different regions, comprising co-axial relatively rotatable ported ring members, one of which is faced with a co-axial ported disc valve arranged in face-sealing relation with the other member and each member having fluid ports opening into its periphery. The members are constructed and arranged so that the direction of flow of fluid through the disc valve from one member to the other will be parallel to the common axis. The disc valve controls communication between the ports in one member and those in the other and the said members are maintained in face sealing relation when fluid under pressure is passing through the ports of the said members.

4 Claims, 2 Drawing Figures

ROTARY UNIONS

This is a division of application Ser. No. 638,334, filed May 15, 1967, now U.S. Pat. No. 3,570,536.

The present invention relates to a distributor for sequentially distributing fluid to a series of operative zones.

Various forms of such a distributor have been proposed but they have in general comprised relatively rotating members with co-operating cylindrical or conical faces containing the ports for the distribution of the fluid, the fluid passing from the ports in one of the members to the ports in the other member in the radial direction.

According to the present invention a distributor for permitting fluid to be sequentially distributed to different operative zones comprises a ported disc valve member and at least one co-operating co-axial ported member, said members being relatively rotatable and arranged so that the fluid will flow in the direction of the axis of the disc in passing from one member to the other, means being provided for maintaining their co-operating faces in sealing relationship.

Such a distributor is simple and can be produced economically. The co-operating faces of the said members can be made optically flat by relatively simple methods and they can be kept in close contact by spring or like means. Less precision work is necessary to obtain sufficiently close contact between the co-operating faces to prevent unwanted leakage and as compared with cylindrical co-operating faces satisfactory face-to-face sealing contact between the said members can be readily maintained despite wear.

The disc valve member may have one or more ports in he form of an arcuate slot and the quantity of fluid passed determined by the length of the slot in relation to the speed of rotation. Disc valve members with ports of different slot length may be readily interchangeable.

The disc valve member and its co-operating member or members serve as a rotary contact seal ported to control fluid flow and provide a ready means whereby the rate of flow to successive zones can be readily varied in relation to the speed of rotation.

The distributing means are suitable for various purposes, e.g., for apparatus controlled by pneumatic or hydraulic cylinders. The disc valve member may rotate and the said cylinders be connected to the co-operating ported member which is held stationary, or the disc valve member may be held stationary and the co-operating ported member and the cylinders rotate.

According to one embodiment, the disc valve member is non-rotatably arranged with respect to one of two relatively rotatable ported members and axially between said ported members, one of said ported members having fluid supply and return ports and the other of said ported members having successive pairs of inlet and outlet ports for a plurality of operating zones, the disc valve member controlling communication between the said supply inlet ports and said outlet and return ports. The disc valve member may have a plurality of arcuate slots at different radial distances from its center of rotation and these slots may be different length. The supply and return ports may be arranged to permit hot and cold water to be supplied in succession to each operating zone. Such a distributor may be employed in system in which each said zone forms a moulding zone and first hot water will be passed to each mould, then hot water extracted, then cold water so passed and finally extracted, the one ported member having a single hot water supply port and a single hot water return port and a single cold water supply port and a single cold water return port and the other member having pairs of inlet and outlet ports to and from the moulds at least equal in number to the number of ports of the first member.

A circular system of rotating moulds can in this way be each subjected to such treatment in one revolution of the series.

In order that the invention may be the more clearly understood reference is hereinafter made to the accompanying drawing, FIG. 1 is a sectional elevation of an embodiment of the invention on the line B—B of FIG. 2.

Figure 2:
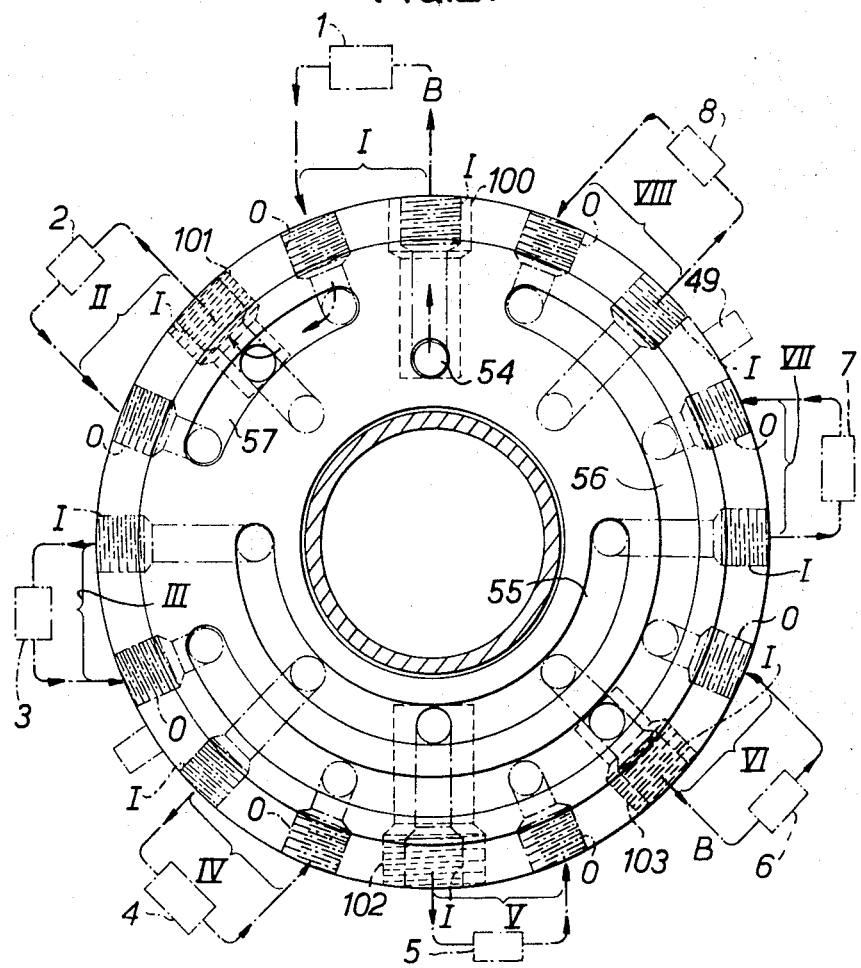

FIG. 2 is a section along line C—C of FIG. 1.

The apparatus shown comprises a series of mould stations to which hot and/or cold water can be delivered and/or extracted under the control of the valve.

A ported ring 45 and journaled bearing 46 rotate and are driven in any suitable manner, e.g., by way of the torque pin 49 (FIG. 2). The central shaft or tube 41 carries a collar 42 to which a bellows 42a is welded, brazed, glued or otherwise secured and the disc valve 44 is non-rotatably arranged with respect to the ported fixed ring 43. By "fixed" in describing fixed ring 43 is meant that the ring 43 is integrally attached to the bellows 42a which are in turn attached to collar 42 thus rendering ring 43 non-rotatable. As the bellows 42a expand or contract non-rotatably, fixed ring 43 moves axially but not rotatably with respect to tube 41. The contacting faces of the rotary ported ring 45 and the disc valve 44 are kept in sealing contact by the axial thrust of the bellows 42a and this thrust is determined by the spacing between the collar 42 and the fixed ring 43. Adjustment of the spacing is accomplished by a thrust bearing assembly 52 having a screw-nut 48 threaded onto the end of the shaft 41 remote from the collar 42 so as to act on thrust bearing 47 disposed between the nut 48 and the ring 43 by a grub or set screw 53. The valve disc 44 has one hole 54 and three arcuate slots 55, 56, 57 and the proportions and arrangement of the slots and of the ports being variable to suit the purpose of the apparatus.

In the form illustrated there are eight moulds 1 to 8 permanently connected to the ported ring 45 with supply and return pipes. There are four permanent connections to the fixed ring 43, one hot water supply port 100 and one hot water return port 101 and one cold water supply port 102 and one cold water return port 103. The eight moulds are disposed at 45° stations on a rotary table and each is connected to a supply port I on the rotary ported ring 45 and to a return port O on the said ring.

At station I — hot water is supplied via supply port 100 through hole 54 in the valve 44, port I, in the rotary ported ring 45 and the mould and extracted return port O in the rotary ported ring 45, slot 57 in the valve and hot water return port 101.

At station II — hot water supply is cut off by the valve and the hot water is extracted from the mould through the slot 57 in the valve and the hot water return 101. The mould is now hot and dry.

At station III — cold water is supplied and extracted. It enters through supply port 102, passes via slot 55 to the inlet port I, through the mould back through outlet port O and via slot 56 back to the cold water return (discharge port) 103.

Similarly at stations IV, V, VI and VII, cold water is supplied and extracted, entering through port 102, passing via slot 55 to the inlet port I, through the mould, back through the outlet port O and via slot 56 to the cold water return port 103.

At station VIII, the mould is cut off from the hot and cold water supply by the valve and cold water is extracted from the mould via port O, slot 56 and the cold water return port 103. The mould is now cold and dry.

The moulds pass successively through the said stations and receive the like treatment.

Thus during each full rotation of the parted ring 45 a mould is heated, extraction completed, cooled in successive stations and finally cleared of cold water.

In any of the aforesaid embodiments the member or each member co-operating with the disc valve member may be provided with a removable or interchangeable seat component.

What we claim is:

1. A distributor for permitting fluid to be sequentially distributed to different operative zones, comprising two relatively rotatable, coaxial members and a ported disc valve member which is non-rotatable arranged with respect to one of the two relatively rotatable co-axial ported members and located axially between said two relatively rotatable coaxial ported members, said two relatively rotatable members and ported disc valve member having opposed plane faces with said ports opening into said faces whereby upon rotation of one of said relatively rotatable members said ports in said members come successively into alignment so that fluid will flow through said ports in the direction of the axis of the disc valve member, means for maintaining the said members in face sealing relationship, one of said relatively rotatable ported members having sets of fluid supply and return ports and the other of said relatively rotatable ported members having successive pairs of inlet and outlet ports for a plurality of operating zones, said ports in said disc valve member placing said sets of supply and inlet ports and said successive outlet and return ports respectively in communication and then interrupting such communication during relative rotation of said relatively rotatable ported members.

2. A distributor according to claim 1, in which the disc valve member has a plurality of arcuate slots different radial distances from its center, the arcuate ports in the disc valve placing non-aligned ports in the respective relatively rotatable ported members in communication and interrupting such communication during relative rotation of the relatively rotatable members.

3. A distributor according to claim 2, in which the said arcuate slots are of different length circumferentially of the disc valve member.

4. A distributor according to claim 3 in which the supply and return ports in each of the relatively rotatable members open into the faces thereof at different radial distances from the center to register with the arcuate slots in the disc valve.

* * * * *